(12) United States Patent
Shirakawa et al.

(10) Patent No.: US 6,499,889 B1
(45) Date of Patent: Dec. 31, 2002

(54) METHOD OF ASSEMBLING OPTICAL CONNECTOR, OPTICAL CONNECTOR AND HYBRID CONNECTOR

(75) Inventors: Tsuguhito Shirakawa, Shizuoka (JP); Nobuyuki Akeda, Shizuoka (JP); Toshiharu Takahashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/543,559

(22) Filed: Apr. 5, 2000

(30) Foreign Application Priority Data

Dec. 8, 1999 (JP) .......................................... 11-348495
Dec. 8, 1999 (JP) .......................................... 11-348497

(51) Int. Cl.$^7$ .............................................. G02B 6/36
(52) U.S. Cl. .............................. 385/88; 385/92; 257/99
(58) Field of Search .............................. 385/52, 60, 88, 385/92, 93, 94, 89, 75, 91, 90; 257/98, 99

(56) References Cited

U.S. PATENT DOCUMENTS 5,233,676 A * 8/1993 Yonemura et al. ............ 385/88
6,113,280 A * 5/2000 Nagaoka et al. .............. 385/53
6,239,427 B1 * 5/2001 Mizue ........................ 250/239
2001/0016443 A1 * 8/2001 Gimbel ........................ 439/358

FOREIGN PATENT DOCUMENTS

JP              62229884 A  * 10/1987    ........... H01L/33/00

* cited by examiner

Primary Examiner—Cassandra Spyrou
Assistant Examiner—Euncha Cherry
(74) Attorney, Agent, or Firm—Armstrong, Westerman & Hattori, LLP

(57) ABSTRACT

A light emitting module and a light receiving module are indirectly received in respective module receiving sections of a shield casing so as to set the modules in position in the shield casing. The shield casing is then mounted in an optical housing to assemble an optical connector. Positioning of the light emitting module and the light receiving module and their leads is easily attained. The operation for assembling the optical connector is facilitated.

15 Claims, 17 Drawing Sheets

F I G. 11
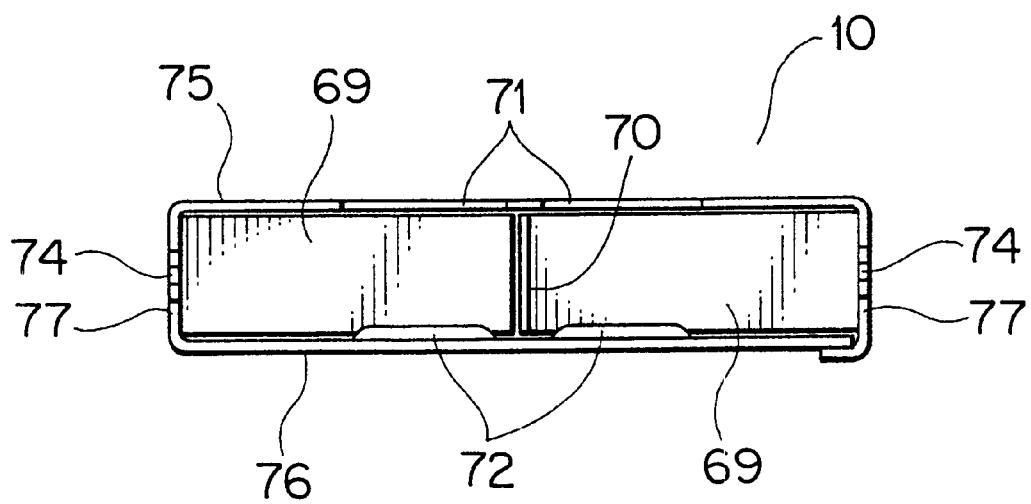
F I G. 12
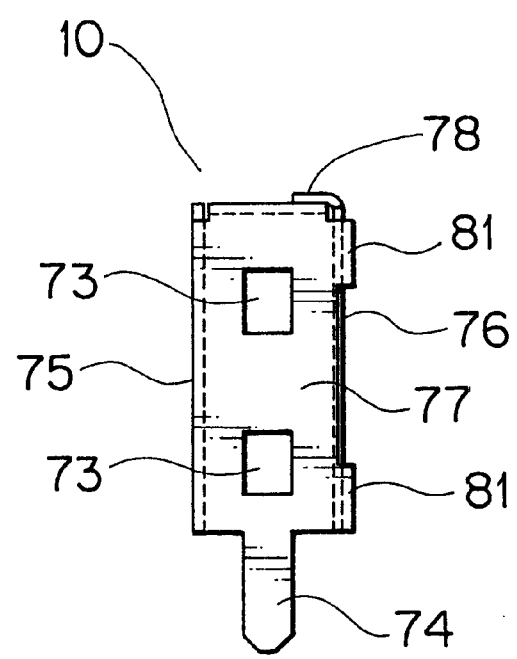

METHOD OF ASSEMBLING OPTICAL CONNECTOR, OPTICAL CONNECTOR AND HYBRID CONNECTOR

BACKGROUND OF THE INVENTION

1. Field of the Invention

This invention relates to a method of assembling an optical connector, and to an optical connector and a hybrid connector including the optical connector and an electrical connector. This invention also relates to a method of positioning a light emitting element module and a light receiving element module for the optical connector.

2. Description of the Related Art

In a vehicle such as an automobile, there are many signals transmitted from various sensors and many signals used to control various electronic components. If these signals are transmitted by using individual signal lines, the number of the signal lines becomes large, resulting in the wiring harness weighing very heavy. In addition, the information transmitted has had large volumes and densities year by year.

To cope with this, in recent years, there has been adopted a system in which part of the wiring harnesses are replaced by optical fiber cables. For example, a connection has been made between nodes by an optical fiber cable.

If the wiring harnesses are partly replaced by optical fiber cables, it requires optical connectors which include a female optical connector called "optical plug" attached to an end of the optical fiber cables and a male optical connector called "receptacle" made up of an optical housing and a light emitting and light receiving modules having a light emitting and light receiving elements, respectively, mounted in the optical housing.

To assemble the male optical connector, however, it is required to mount the light emitting and light receiving modules in position in an optical housing one by one, making the assembling operation troublesome.

In this connection, if the wiring harnesses are partly replaced by optical fiber cables, it becomes troublesome to make connections, for example at a carmaker, between related electrical connectors and optical connectors. To cope with this, it has been desired to put to use a hybrid connector which combines in one an electrical connector and an optical connector and completes connection of the electrical connector and the optical connector at one connecting operation. The one-by-one mounting of the light emitting and light receiving modules will also make the assembling of such hybrid connector troublesome.

Further, the male optical connector, after assembled, is implemented on a printed circuit board, and it is necessary that leads of the light emitting and light receiving modules are set in precise position so as not to hit the board and be crimped during the implementation on the board. To this end, in assembling the optical connector, extreme care has been taken to accurately position the light emitting and light receiving modules, resulting in an adverse effect on the productivity and cost increase of the optical connectors. The above also applies in the case of hybrid connectors including an optical connector.

SUMMARY OF THE INVENTION

This invention has been accomplished to overcome the above drawbacks and an object of this invention is to provide a method of easily assembling an optical connector, and an optical connector and a hybrid connector which can be easily assembled. Another object is to provide a method of positioning a light emitting and light receiving elements modules which leads to an improvement in productivity.

In order to attain the objects, according to an aspect of this invention, there is provided a method of assembling an optical connector including a light emitting module and a light receiving module, the light emitting module having a first molded portion of transparent synthetic resin, a light emitting element embedded in the first molded portion and first leads extending out of the first molded portion, the light receiving module having a second molded portion of transparent synthetic resin, a light receiving element embedded in the second molded portion and second leads extending out of the second molded portion, which comprises the steps of placing the light emitting module and the light receiving module directly or indirectly into respective module receiving sections formed in a casing so as to set the light emitting module and the light receiving module in position; and then mounting the casing in an optical housing.

In the above method according to this invention, the light emitting and light receiving modules are directly or indirectly received in the respective module receiving sections of the casing to be set in position. If the light emitting and light receiving modules are received in position in the casing, the optical connector can be readily assembled by mounting the casing in the optical housing. In other words, the light emitting and light receiving modules can, in advance in a separate process, be received directly or indirectly in the casing. This allows the operation for assembling the optical connector to be performed easily.

Preferably, the first and second molded portions are directly or indirectly provided, at positions corresponding to the light emitting and light receiving elements, with respective cylindrical portions for receiving a sleeve with a core and a cladding, and the step of placing the light emitting module and the light receiving module into the respective module receiving sections comprises guiding the cylindrical portions in respective cutouts formed at the module receiving sections so as to set the light emitting module and the light receiving module in position.

In the above method, the cutouts guide therein the cylindrical portions, which are provided directly or indirectly to the first and second molded portions, to facilitate the operation of placing the light emitting and light receiving modules in position.

Advantageously, the cutouts have a width equal to an outer diameter of the cylindrical portions.

According to another aspect of this invention, there is provided an optical connector which comprises: a light emitting module having a first molded portion of transparent synthetic resin, a light emitting element embedded in the first molded portion and first leads extending out of the first molded portion; a light receiving module having a second molded portion of transparent synthetic resin, a light receiving element embedded in the second molded portion and second leads extending out of the second molded portion; two sleeves of cylindrical shape, each having a core and a cladding extending along a center axis thereof; a casing having two module receiving sections for receiving the respective first and second molded portions directly or through respective first and second module casings fitted over the first and second molded portions; and a housing having a receiving section for receiving the sleeves and the casing, wherein the first and second molded portions or the first and second module casings are provided, at positions corresponding to the light emitting and light receiving elements, with respective cylindrical portions for receiving the sleeves, and the casing has cutouts formed in a wall thereof defining the module receiving sections for guiding the cylindrical portions so as to set the light emitting module and the light receiving module in position.

In the above optical connector, when the light emitting and light receiving modules are directly or indirectly received in the respective module receiving sections of the casing, the cylindrical portions are guided in the related cutouts to bring the modules to position. If the light emitting and light receiving modules are received in position in the casing, the optical connector can be readily assembled by mounting the casing in the optical housing. In other words, owing to the first and second molded portions or the first and second module casings provided with the cylindrical portions for receiving the sleeves, and to the casing having the cutouts for guiding the cylindrical portions to bring the light emitting and light receiving modules to position, the light emitting and light receiving modules can, in advance in a separate process, be received directly or indirectly into the module receiving sections of the casing. This allows the operation for assembling the optical connector to be performed easily.

Advantageously, the cutouts have a width equal to an outer diameter of the cylindrical portions.

Advantageously, the casing is formed of electrically conductive material.

According to yet another aspect of this invention, there is provided a hybrid connector which comprises an optical connector as referred to above, and an electrical connector having an electrical housing with a mount section for mounting the optical connector and terminals inserted into the electrical housing.

According to yet another aspect of this invention, there is provided a light emitting and light receiving modules positioning method for an optical connector including a light emitting module and a light receiving module, the light emitting module having a first molded portion of transparent synthetic resin, a light emitting element embedded in the first molded portion and first leads extending out of the first molded portion, the light receiving module having a second molded portion of transparent synthetic resin, a light receiving element embedded in the second molded portion and second leads extending out of the second molded portion, which comprises the steps of: placing the light emitting module and the light receiving module directly or indirectly into respective module receiving sections formed in a casing so as to set the first and second molded portions in position relative to each other; and then mounting the casing in an optical housing while restricting tilting of the first and second molded portions in a rotational direction about an optical axis of the optical connector so as to set the first and second leads in position.

In the above method according to this invention, if the light emitting and light receiving modules are directly or indirectly received into the respective module receiving sections of the casing, the first and second molded portions are set in position relative to each other. If the casing is then mounted in the optical housing, the tilting of the first and second molded portions in a rotational direction about the optical axis is restricted to set the first and second leads in position.

In other words, the positioning of the light emitting and light receiving modules is spontaneously completed during the assembly.

Preferably, the first and second molded portions are directly or indirectly provided, at positions corresponding to the light emitting and light receiving elements, with respective cylindrical portions for receiving a sleeve with a core and a cladding, and the step of placing the light emitting module and the light receiving module into the respective module receiving sections and the step of restricting tilting of the first and second molded portions are effected through the cylindrical portions.

Preferably, the step of placing the light emitting module and the light receiving module into the respective module receiving sections comprises guiding the cylindrical portions in respective cutouts formed at the module receiving sections so as to set the first and second molded portions in position relative to each other.

Advantageously, the cutouts have a width equal to an outer diameter of the cylindrical portions.

Preferably, the step of restricting tilting of the first and second molded portions so as to set the first and second leads in position comprises bringing into contact with each other flat surfaces formed on the cylindrical portions and in the optical housing.

In the above method, because the positioning of the first and second leads is effected through the engagement of the flat surfaces with each other, it is spontaneously effected by mounting the casing in the optical housing during the assembly.

Advantageously, the cylindrical portions are of such an inner diameter as to snugly receive the sleeves.

According to a further aspect of this invention, there is provided an optical connector which comprises: a light emitting module having a first molded portion of transparent synthetic resin, a light emitting element embedded in the first molded portion and first leads extending out of the first molded portion; a light receiving module having a second molded portion of transparent synthetic resin, a light receiving element embedded in the second molded portion and second leads extending out of the second molded portion; two sleeves of cylindrical shape, each having a core and a cladding extending along a center axis thereof; a casing having two module receiving sections for receiving the respective first and second molded portions directly or through respective first and second module casings fitted over the first and second molded portions; and a housing having a receiving section for receiving the sleeves and the casing, wherein the first and second molded portions or the first and second module casings are provided, at positions corresponding to the light emitting and light receiving elements, with respective cylindrical portions for receiving the sleeves, the cylindrical portions have a flat surface formed thereon, the casing has cutouts formed in a wall thereof defining the module receiving sections for guiding the cylindrical portions so as to set the light emitting module and the light receiving module in position, and the housing has a flat surface formed in the module receiving sections, which corresponds to the flat surface on the cylindrical portions.

In the above optical connector according to this invention, if the light emitting and light receiving modules are directly or indirectly received in the respective module receiving sections of the casing, the cylindrical portions are guided in the respective cutouts so as to spontaneously set the light emitting and light receiving modules in position. If the casing is then mounted in the optical housing, the tilting of the first and second molded portions in a rotational direction about the optical axis is restricted to set the first and second leads in position.

Advantageously, the cutouts have a width equal to an outer diameter of the cylindrical portions.

Advantageously, the casing is formed of electrically conductive material.

Advantageously, the cylindrical portions are of such an inner diameter as to snugly receive the sleeves.

According to a further aspect of this invention, there is provided a A hybrid connector comprising an optical connector as referred to above, and an electrical connector having an electrical housing with a mount section for mounting the optical connector and terminals inserted into the electrical housing.

The term "hybrid connector" used herein is intended to mean a connector having an optical connector and an electrical connector combined in one.

The above and other objects, features and advantages of this invention will become apparent from the following description and the appended claims, taken in conjunction with the accompanying drawings.

BRIEF DESCRIPTION OF THE DRAWINGS

FIG. 11 is a bottom view of the shield casing;

FIG. 12 is a right side view of the shield casing;

DESCRIPTION OF THE PREFERRED EMBODIMENT

One embodiment of this invention will now be described with reference to the attached drawings.

Figure 1:
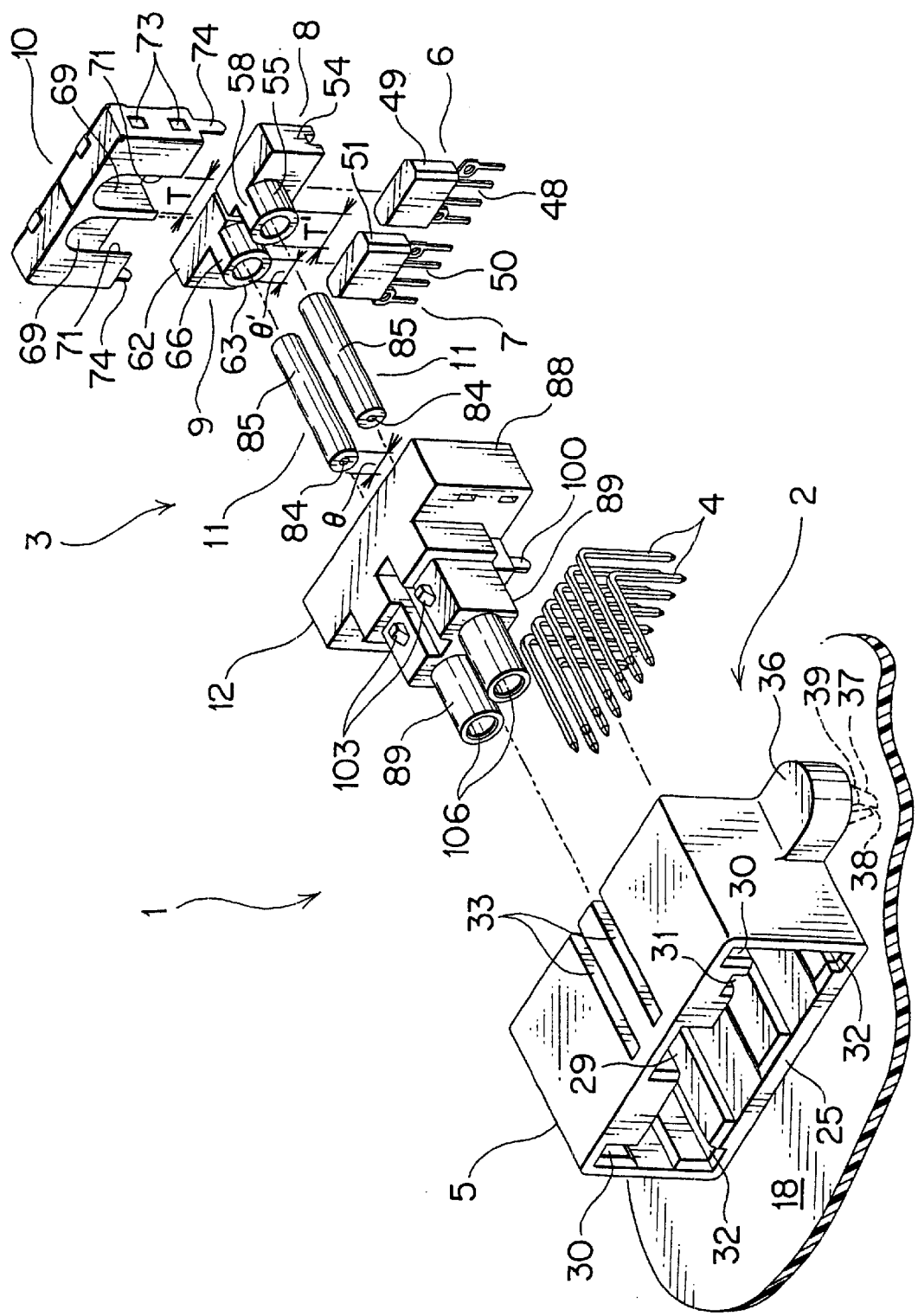
FIG. 1 is an exploded perspective view of a hybrid connector, showing one embodiment of an optical connector of a male type according to this invention.

In FIG. 1, a hybrid connector 1 of a male type, which is implemented on a known printed circuit board 18, includes a male electrical connector 2 and a male optical connector 3 assembled to the electrical connector 2.

The electrical connector 2 includes a plurality of PCB terminals 4 and an electrical housing 5. The optical connector 3 includes FOTs 6, 7 (FOT: fiber optical transceiver, also referred to as optical element module (light emitting or light receiving module)), FOT casings 8, 9, a shield casing 10, sleeves 11, 11, and an optical housing 12.

The optical connector 3, as will be later described, have a structure which allows easy assembling, and which is featured by the positioning of the FOTs 6 and 7.

Figure 2:
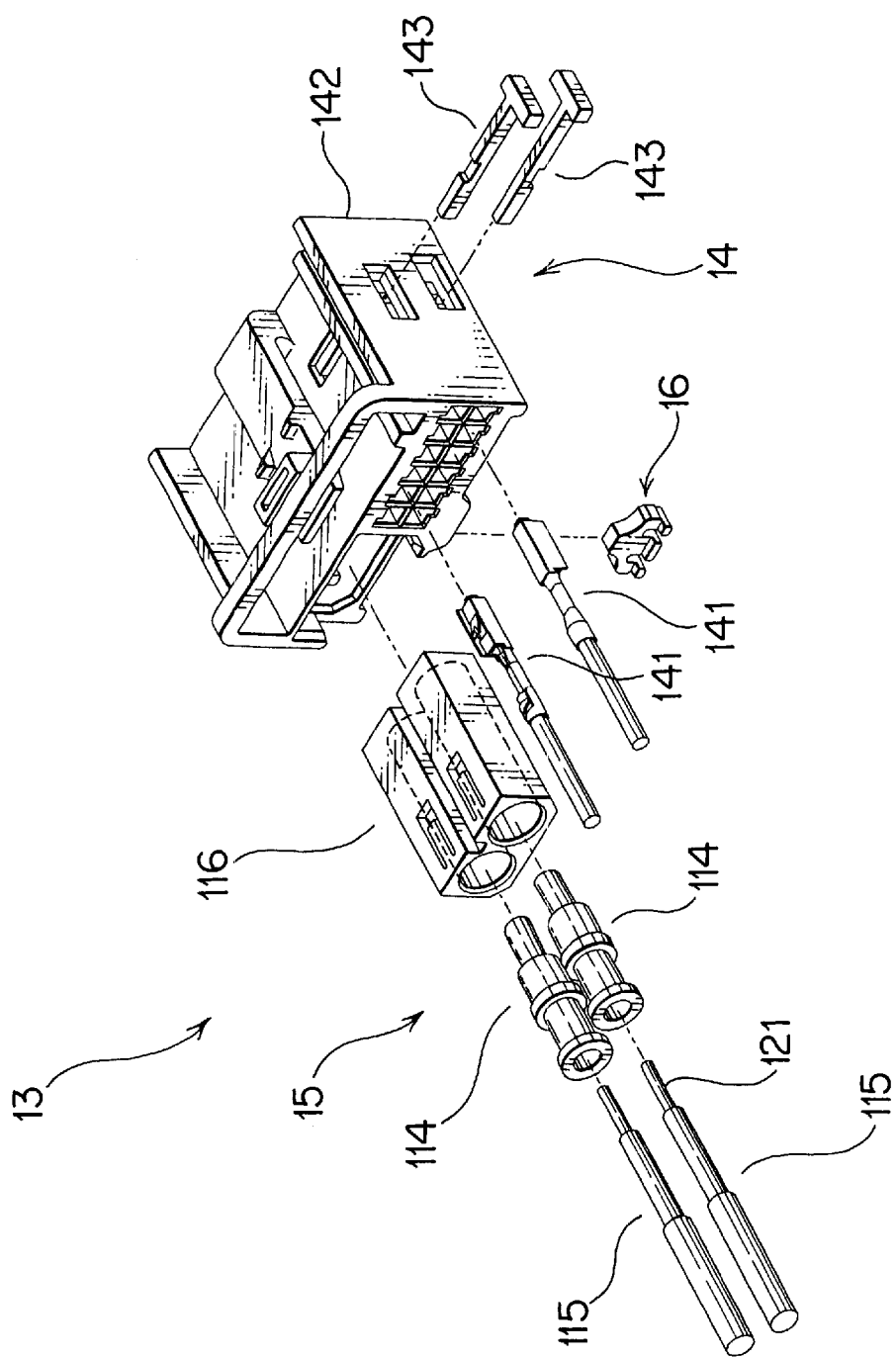
FIG. 2 is an exploded perspective view of a hybrid connector which mates with the hybrid connector of FIG. 1.
Figure 3:
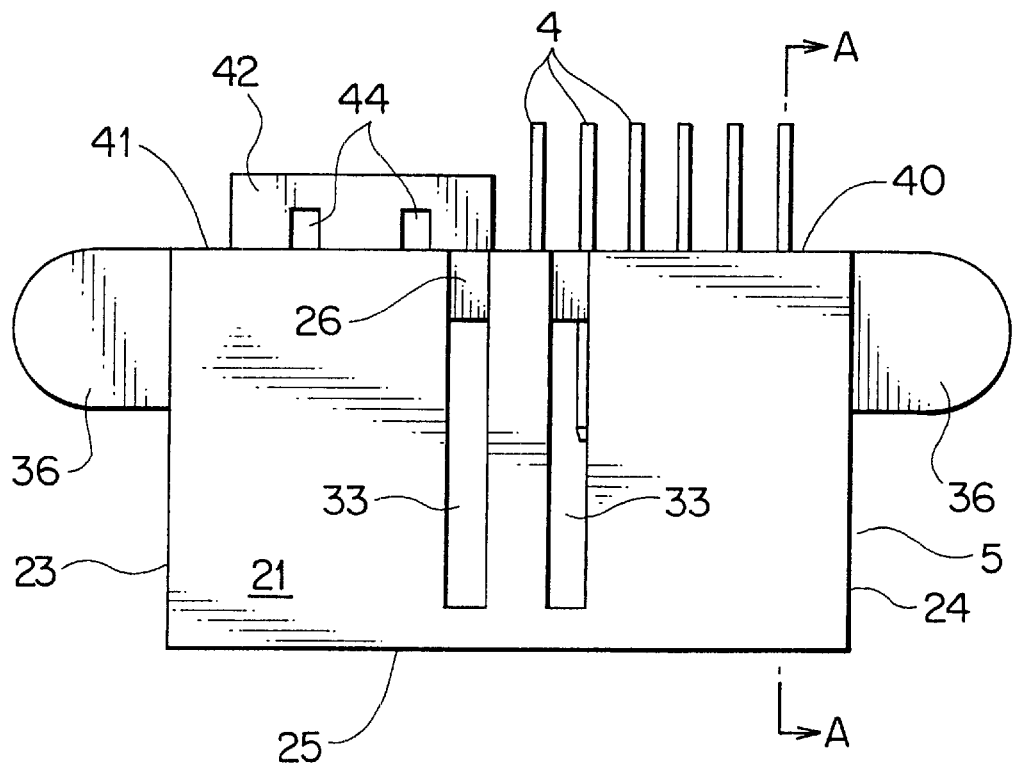
FIG. 3 is a plan view of an electrical connector in FIG. 1.
Figure 4:
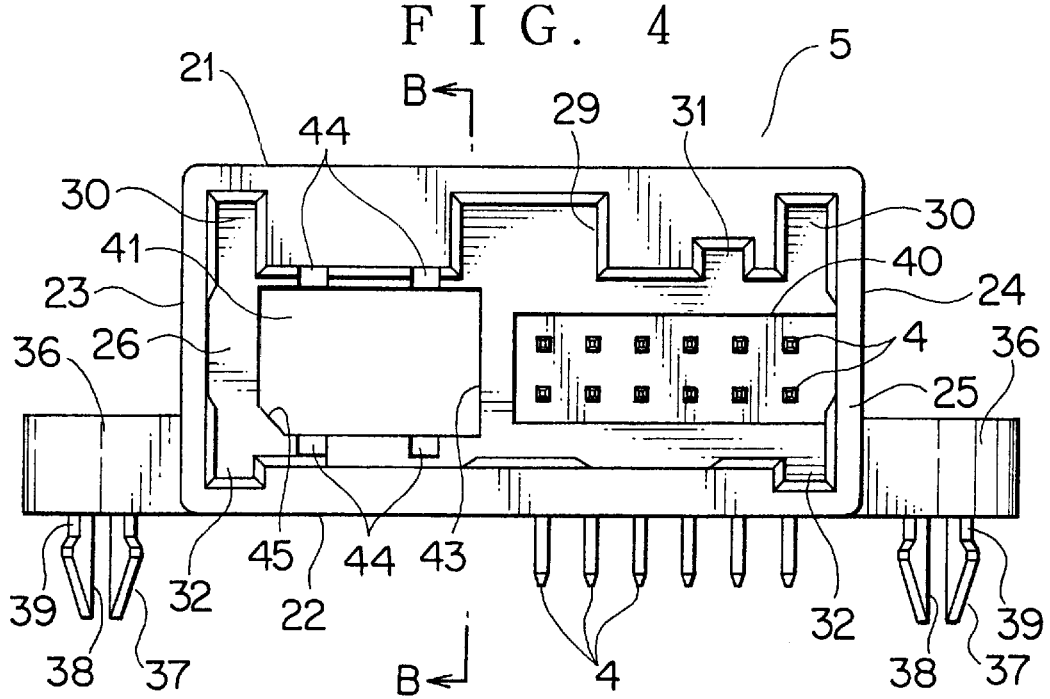
FIG. 4 is a front view of the electrical connector.
Figure 5:
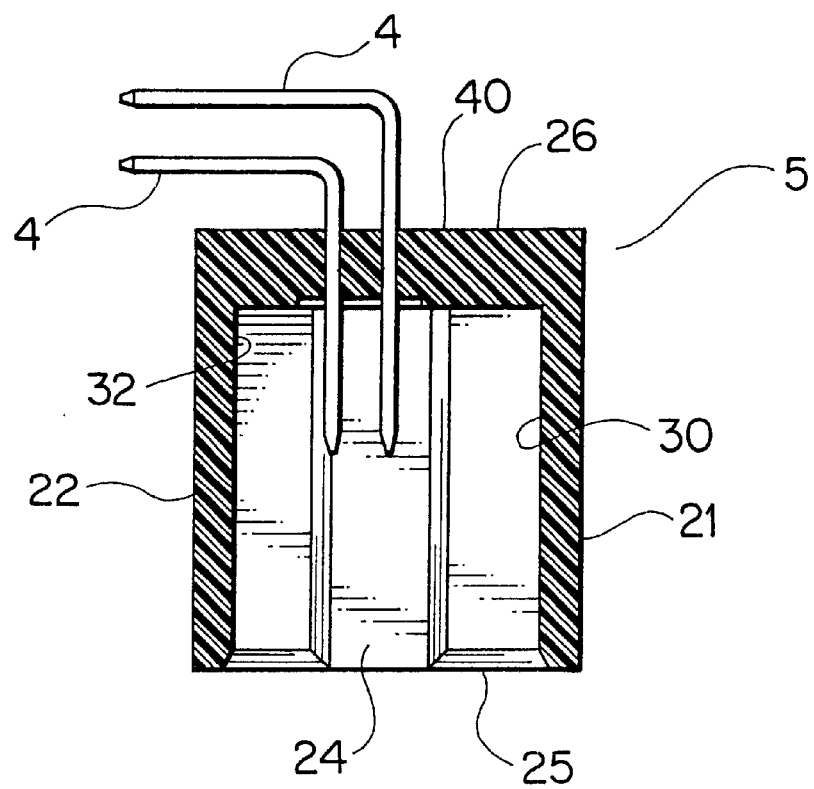
FIG. 5 is a sectional view taken along the line A—A of FIG. 3.
Figure 6:
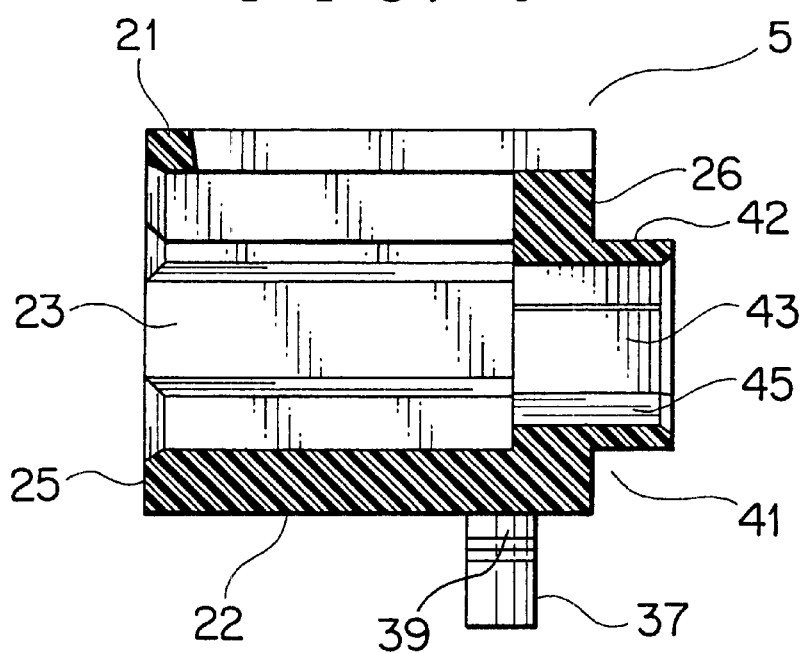
FIG. 6 is a sectional view taken along the line B—B of FIG. 4.

In FIG. 2, a hybrid connector 13 of a female type which mates with the hybrid connector 1 includes a female electrical connector 14, a female optical connector 15 assembled to the electrical connector 14, and a holder 16.

Each constituent element of the hybrid connector 1 will now be described in detail.

The PCB terminals 4 are known electrically-conductive male terminals and, as shown in FIG. 1, bent in L-like form to be located at one end in the electrical housing 5 and fixed at the other end to the not-shown printed circuit board. The PCB terminals 4, in the present embodiment, are placed in two, upper and lower tiers (six for each tier) in the electrical housing 5 and thus provided in two types having different lengths.

The electrical housing 5 is made of synthetic resin and, as shown in FIGS. 3 to 6, has a bottomed box-like shape opening at the front.

In other words, the electrical housing 5 has an upper wall 21 of rectangular shape when viewed from top, a bottom wall 22 parallel to the upper wall 21, a left and right side walls 23 and 24 contiguous to the upper and lower walls 21 and 22 at the lateral ends, and a rear wall 26 located at a side opposite the insertion open end 25 for the mating hybrid connector 13 (FIG. 2), which rear wall is contiguous to the upper, lower, left and right side walls 21, 22, 23 and 24.

At the inner side of the upper wall 21, there are formed an engagement dent 29 and guide grooves 30, 30 and 31, all extending along a fitting direction of the mating hybrid connector 13. The lower wall 22 is formed at its inner side with guide grooves 32, 32.

The engagement dent 29 extends straight at a center of the upper wall 21, from the open end 25 to an inner surface of the rear wall 26, and has a rectangular section under the upper wall 21. There are formed slits 33, 33 in the upper wall 21, which are in communication with the engagement dent 29 and extend from near the open end 25 to the rear wall 26.

The guide grooves 30, 30 extend straight at the lateral ends of the upper wall 21, from the open end 25 to the inner surface of the rear wall 26, and are laterally defined by the respective left and right side walls 23 and 24. The guide grooves 30, 30 have a rectangular section under the upper wall 21. The guide grooves 30, 30 have a depth equal to the engagement dent 29, but a width smaller than the latter.

The guide groove 31 is interposed between the engagement dent 29 and the guide groove 30 on the side of the right side wall 24, and extends straight from the open end 25 to the inner surface of the rear wall 26. The guide groove 31 also has a rectangular section under the upper wall 21 and has a depth roughly one half that of the guide grooves 30, 30 and a width equal to the latter.

The guide grooves 32, 32 are formed at the lateral ends of the lower wall 22, in opposition to the respective guide grooves 30, 30 and are laterally defined by the respective left and right side walls 23 and 24. The guide grooves 32, 32 have a rectangular section. on the lower wall 22. The guide grooves 32, 32, like the guide grooves 30, 30 and 31 formed on the upper wall 21, extend straight from the open end 25 to the inner surface of the rear wall 26. The guide grooves 32, 32 have a depth smaller than the guide groove 31 and a width equal to the guide grooves 30, 30.

The left and right side walls 23 and 24 are provided with a mounting portion 36 with which to mount on the printed circuit board 18 (FIG. 1). The mounting portion 36 is roughly semicircular when viewed from top and has a height approximately one fourth the height of the left and right walls 23, 24. The mounting portion 36 has a lower surface flush with the lower wall 22 and a clip 37 at the lower surface for insertion through elastic deformation through and engagement with a corresponding hole formed in the printed circuit board 18.

The clip 37 is detachably fittable in the hole (not shown) in the printed circuit board 18 and has a central transversal slit 38 which allows the clip to be deformed inwardly. The clip 37 engages by its portions 39 in the not-shown hole to be retained there.

The rear wall 26 is flat and perpendicular to the upper, lower, left and right side walls 21, 22, 23, 24 and has a PCB terminal mount section 40 and an optical connector mount section 41 juxtaposed to each other.

The PCB terminal mount section 40 is located toward the right side wall 24 and receives the PCB terminals 4 at the one end side in two tiers into the electrical housing 5. The PCB terminals 4 are pressed into at the terminal mount section 40 or insert-molded to form the electrical connector 2. The bends of the PCB terminals 4 in the upper tier are located remoter from the rear wall 26 than those of the PCB terminals 4 in the lower tier.

The optical connector mount section 41 is located toward the left side wall 23 and includes a holder portion 42 (FIG. 6) projecting from the rear wall 26 and an insertion opening 43 for the optical connector 3 (FIG. 1). The insertion opening 43 extends in the connector fitting direction through the holder portion 42 and the rear wall 26 to communicate to the inside of the electrical housing 5.

The holder portion 42 has a rectangular shape and projects perpendicularly to the rear wall 26. The holder portion 42 has its tip end projecting slightly farther than the bends of the PCB terminals 4 arranged in the lower tier in the PCB terminal mount section 40. The upper and lower walls of the holder portion 42 are each formed with two rectangular engagement holes 44 which communicate to the insertion opening 43.

The insertion opening 43 has a rectangular cross section and is formed with a taper surface 45 at the corner between the lower and left side walls 22 and 23, which taper surface extends longitudinally of the insertion opening 43. The taper surface 45 serves to prevent an erroneous fitting of the optical connector 3 (FIG. 1). The taper surface 45 may be located at other than the above-mentioned corner and may be replaced by a projection or groove as far as serving the above effect.

The FOT 6, as shown in FIG. 1, includes a molded portion 49 and a plurality of leads 48 extending from the molded portion. One of the leads 48 is mounted with a light emitting element (not shown). Wire bonding is also effected. The leads 48 are fixed (soldered) at the lower end to the printed circuit board 18. The not-shown light emitting element is disposed not at the center of the FOT 6 (or of the molded portion 49), but rather at a side toward the FOT 7. A light emitting diode (LED), for example, can be mentioned as the light emitting element of the FOT (light emitting element module) 6.

The molded portion 49 is molded to have a rectangular cross section from transparent resin material capable of transmitting light (for example, epoxy resin preferably having the same refractive index as that of a later-described plastic optical fiber 121). The leads 48 are embedded at the upper end in the molded portion 49. The molded portion 49 protects the light emitting element and the like from outside.

The FOT 7, as shown in FIG. 1, includes a molded portion 51 and a plurality of leads 50 extending from the molded portion. One of the leads 50 is mounted with a light receiving element (not shown). Wire bonding is also effected. The leads 50 are fixed (soldered) at the lower end to the printed circuit board 18. The not-shown light receiving element is disposed not at the center of the FOT 7 (or of the molded portion 51), but rather at a side toward the FOT 6. A photodiode (PD), for example, can be mentioned as the light receiving element of the FOT (light receiving element module) 7.

The molded portion 51, like the molded portion 49, is molded to have a rectangular cross section from transparent resin material capable of transmitting light (for example, epoxy resin preferably having the same refractive index as that of the later-described plastic optical fiber 121). The leads 50 are embedded at the upper end in the molded portion 51. The molded portion 51 protects the light receiving element and the like from outside.

Figure 7:
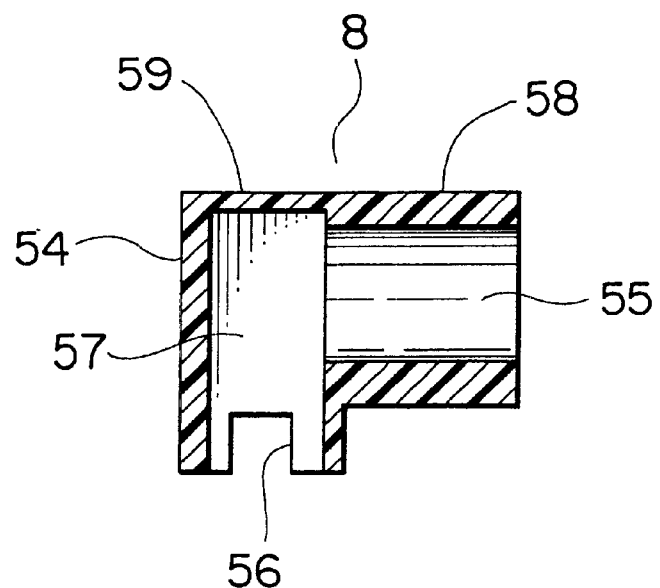
FIG. 7 is a sectional view of an FOT casing as in FIG. 1, which receives an FOT with a light-emitting element.

The FOT casing 8 is made of conductive synthetic resin material containing carbon fibers or the like (may also be made of insulating synthetic resin material, though) and, as shown in FIGS. 1 and 7, includes a case body 54 for covering the molded portion 49 of the FOT 6 and a cylindrical portion 55 projecting from the case body 54.

The case body 54, as shown in FIG. 7, has a bottomed box-like shape. The molded portion 49 of the FOT 6 is pressingly inserted into the case body 54. The case body 54 has a rectangular cutout 56 at the insertion open end for the FOT 6, i.e., in the side wall 57 at the side remote from the cylindrical portion 55.

The cylindrical portion 55 is located at a position corresponding to the light emitting element (not shown) of the FOT 6 and pressingly receives the related sleeve 11 (FIG. 1). The inner diameter $\theta'$ of the cylindrical portion 55 relative to the outer diameter $\theta$ of the sleeve 11 is in the relation of $\theta' \leq \theta$. The cylindrical portion 55 is formed with a flat surface 58 cut thereon which is flush with the upper wall 59 of the case body 54. The flat surface 58 is formed for placing the FOT 6 in position. The molded portion 49 of the FOT 6 may be provided to include the structure of the FOT casing 8.

Figure 8:
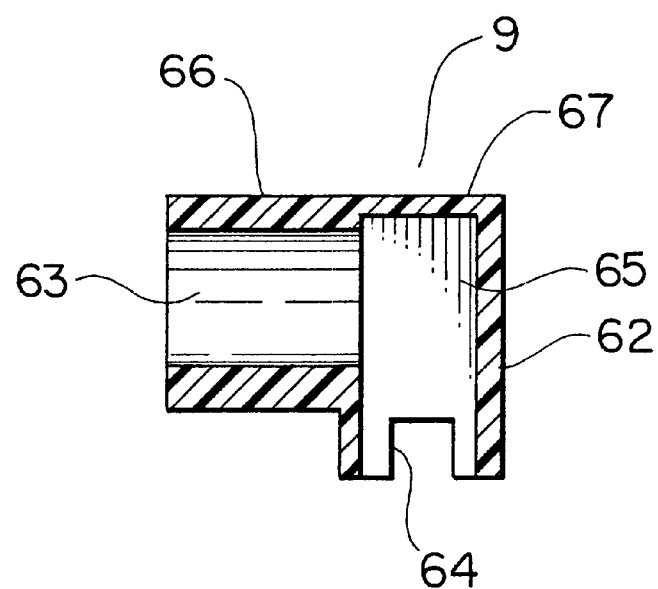
FIG. 8 is a sectional view of an FOT casing as in FIG. 1, which receives an FOT with a light-receiving element.

The FOT casing 9, like the FOT casing 8, is made of conductive synthetic resin material containing carbon fibers or the like (may also be made of insulating synthetic resin material, though) and, as shown in FIGS. 1 and 8, includes a case body 62 for covering the molded portion 51 of the FOT 7 and a cylindrical portion 63 projecting from the. case body 62.

The case body 62 has a bottomed box-like shape, and the molded portion 51 of the FOT 7 is pressingly inserted into the case body 62. The case body 62, as shown in FIG. 8, has a rectangular cutout 64 at the insertion open end for the FOT 7, i.e., in the side wall 65 at the side remote from the cylindrical portion 63.

The cylindrical portion 63 is located at a position corresponding to the light receiving element (not shown) of the FOT 7, pressingly receives the related sleeve 11 (FIG. 1), and is formed with a flat surface 66 cut thereon which is flush with the upper wall 67 of the case body 62. The flat surface 66 is formed for placing the FOT 7 in position. The molded portion 51 of the FOT 7 may be provided to include the structure of the FOT casing 9.

The shield casing 10 is made of a stamped conductive thin metal plate and, as shown in FIGS. 9 to 15, has two juxtaposed receiving sections 69, 69 (juxtaposed in a direction perpendicular to the connector fitting direction) partitioned by a partition wall 70, each having a U-shaped cutout 71, a convex portion 72, rectangular throughholes 73, 73 and a fixing portion 74 with which to fix to the not-shown printed circuit board. The receiving sections 69, 69 pressingly receive the respective FOT casings 8 and 9 (FIG. 1). The shield casing 10 may also be molded from conductive synthetic resin material containing carbon fibers or the like. The conductivity imparted to the shield casing 10 enhances shielding properties for the FOT 6 and FOT 7 (FIG. 1).

The cutouts 71, 71 are formed in the front wall 75 of the receiving sections 69, 69. Into the cutouts 71, 71 are guided the respective cylindrical portions 55, 63 (FIG. 1). If the cylindrical portions 55, 63 are guided into the respective cutouts 71, 71, the positioning of the FOTs 6, 7 is completed. The width T of the cutouts 71, 71 is set equal to the outer diameter T' of the cylindrical portions 55 and 63 for reliable positioning. (It may be T≈T', though.)

The convex portions 72, 72 have an oval shape and are formed by striking to project on the rear wall 76 of the receiving sections 69, 69, at positions corresponding to the cutouts 71, 71. Each convex portion 72 is provided with a circumferential taper.

The throughholes 73, 73 are formed in the side wall 77 of each receiving section 69 opposed to the partition wall 70. The shield casing 10 is fixed in the optical housing 12 (FIG. 1) through the throughholes 73, 73.

The fixing portion 74 extends from each side wall 77 and serves not only to fix the shield casing 10 to the printed circuit board 18 (FIG. 1), but also as a ground terminal.

Figure 9:
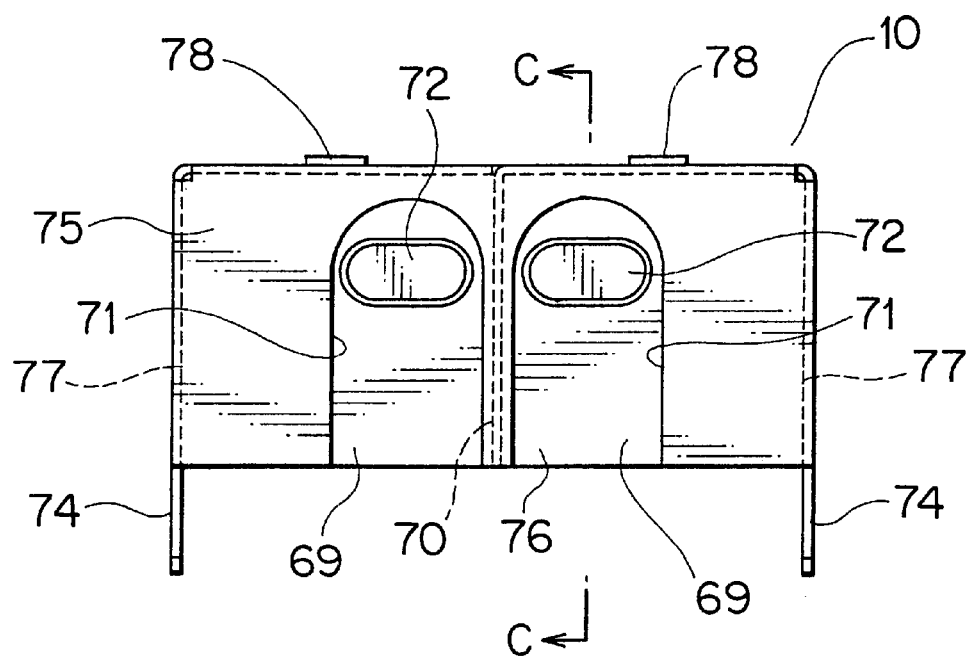
FIG. 9 is a front view of a shield casing as in FIG. 1.
Figure 10:
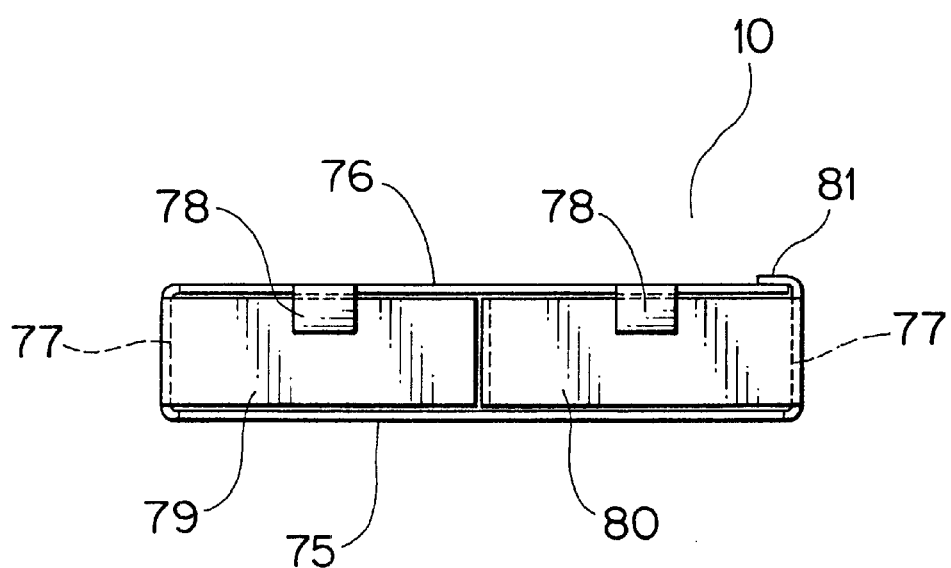
FIG. 10 is a plan view of the shield casing.
Figure 13:
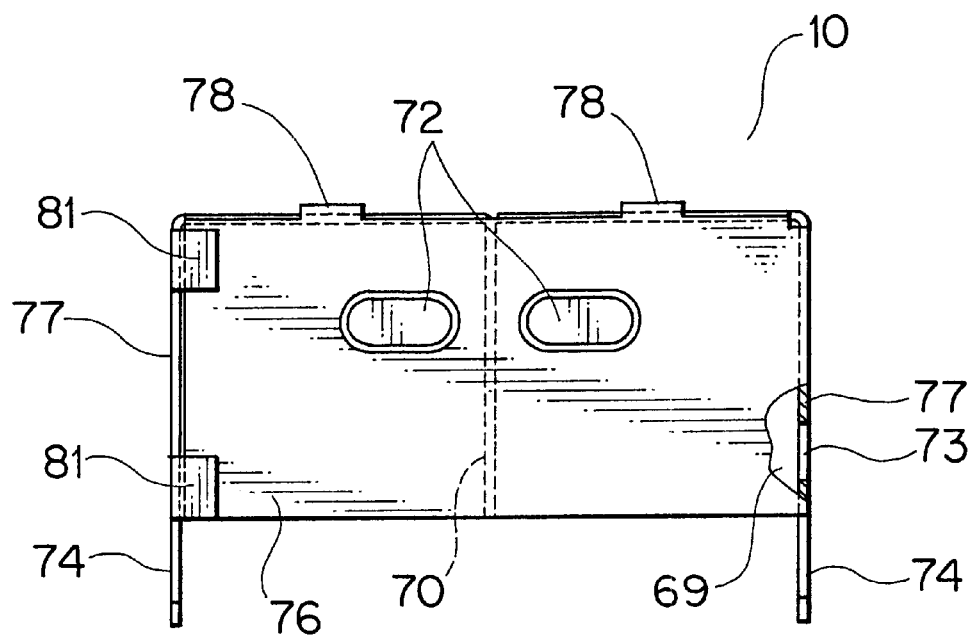
FIG. 13 is a rear view of the shield casing.
Figure 14:
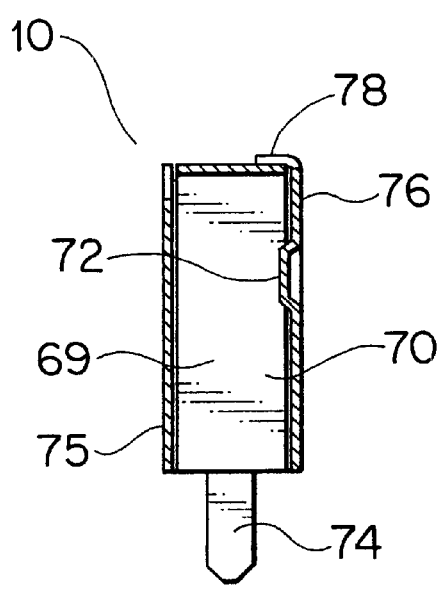
FIG. 14 is a sectional view taken along the line C—C of FIG. 9.
Figure 15:
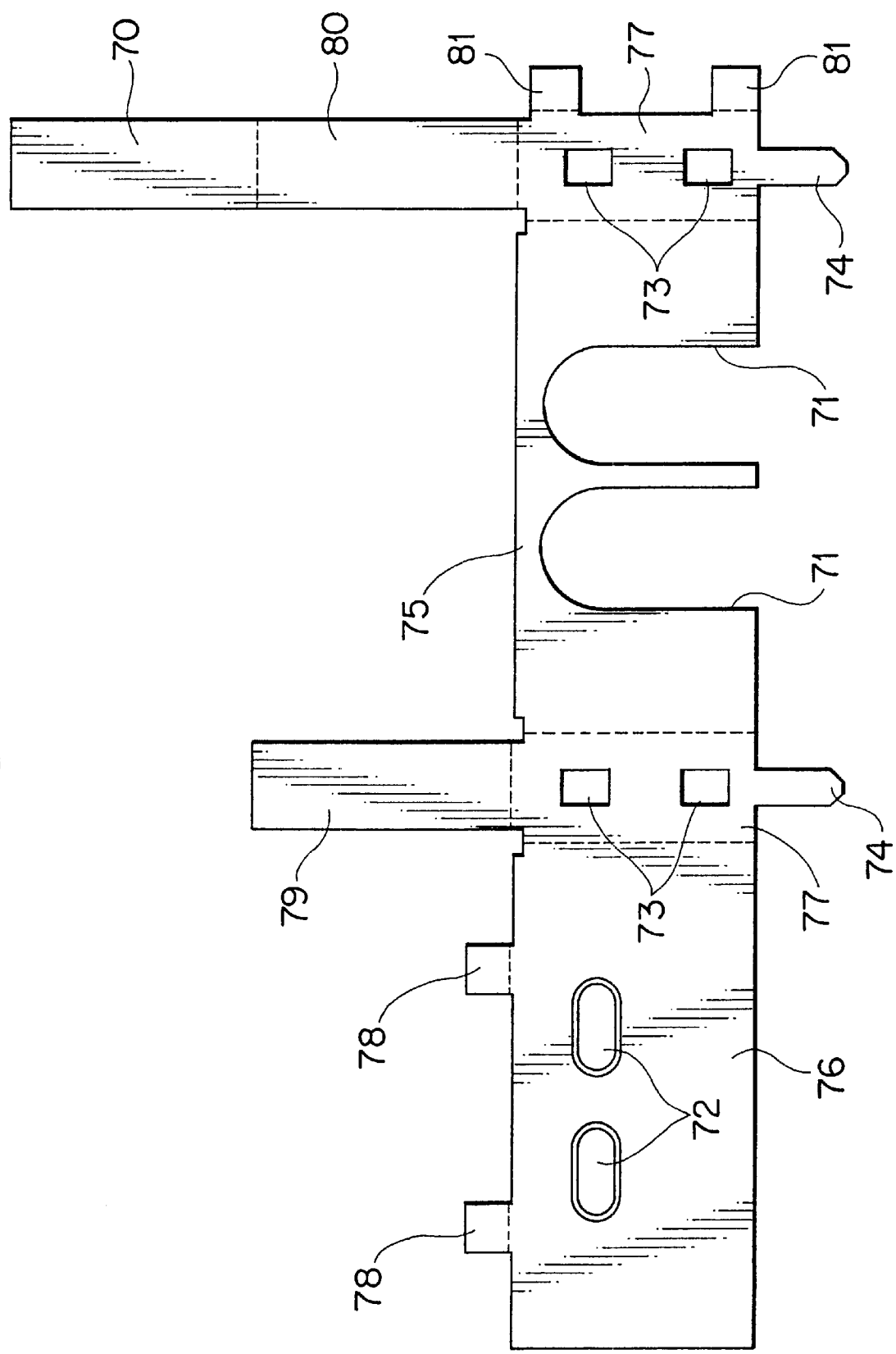
FIG. 15 is a developed view of the shield casing.
Figure 16:
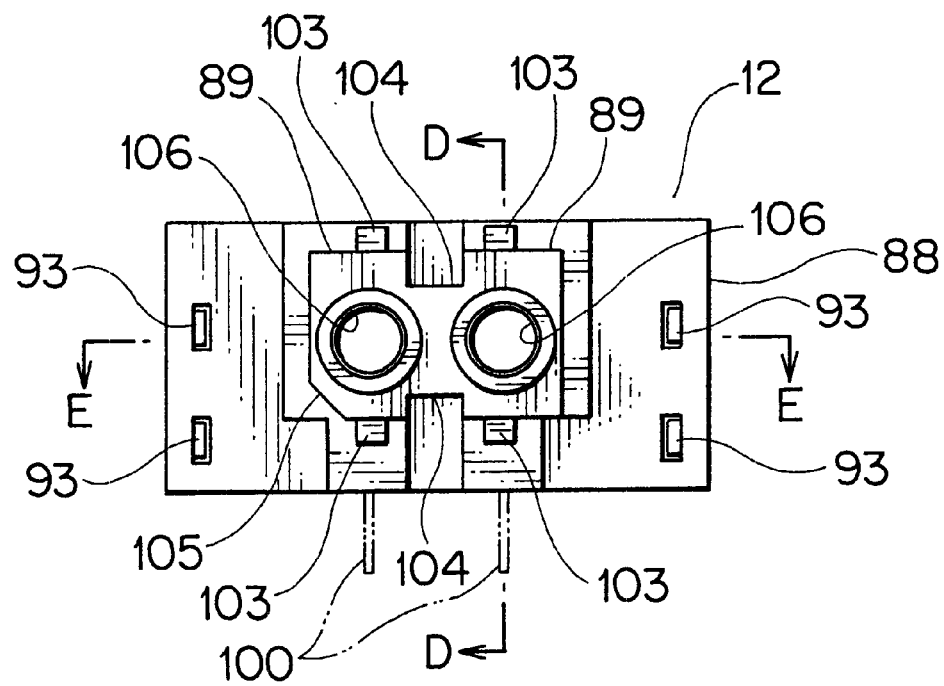
FIG. 16 is a front view of the optical housing as in FIG.
Figure 17:
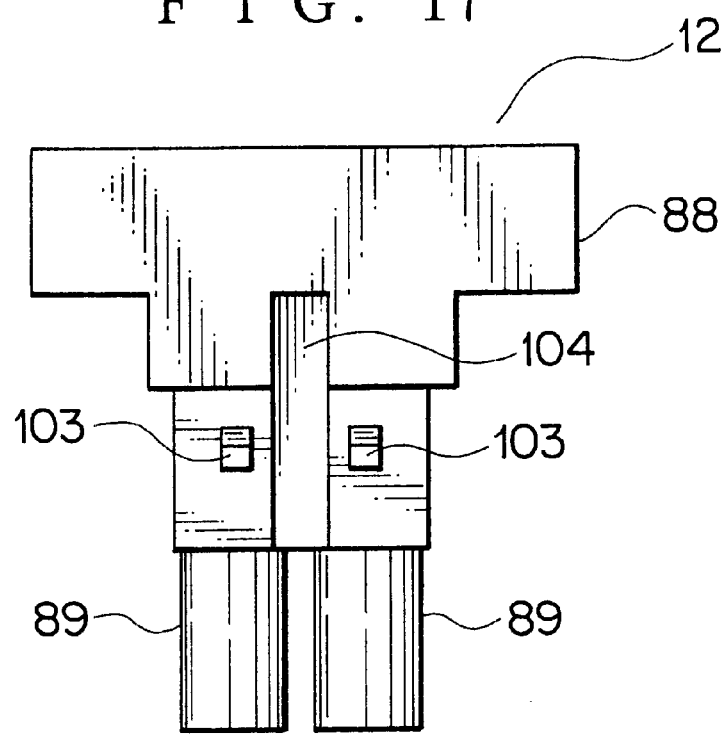
FIG. 17 is a plan view of the optical housing.
Figure 18:
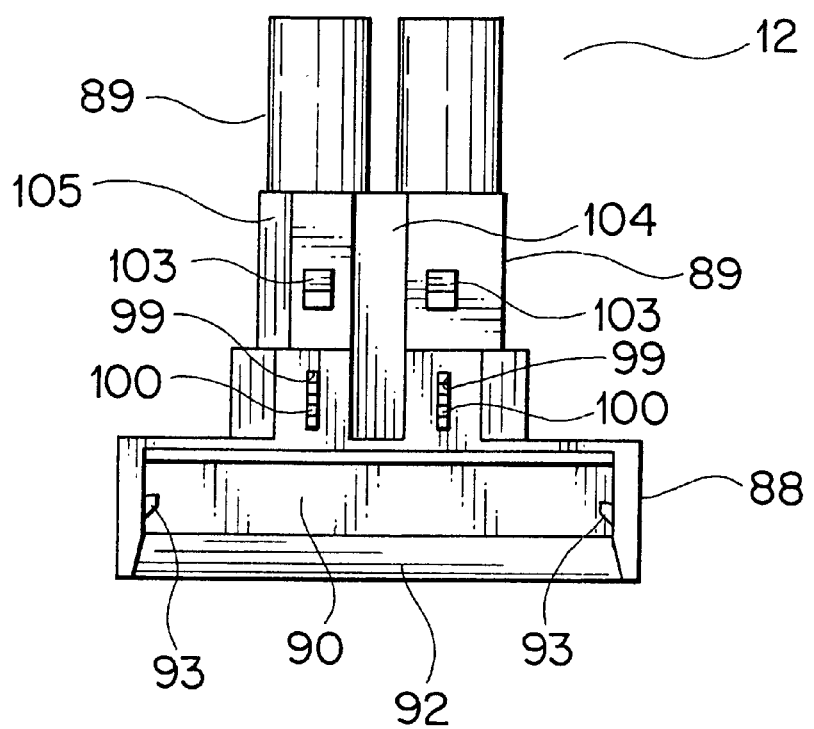
FIG. 18 is a bottom view of the optical housing.
Figure 19:
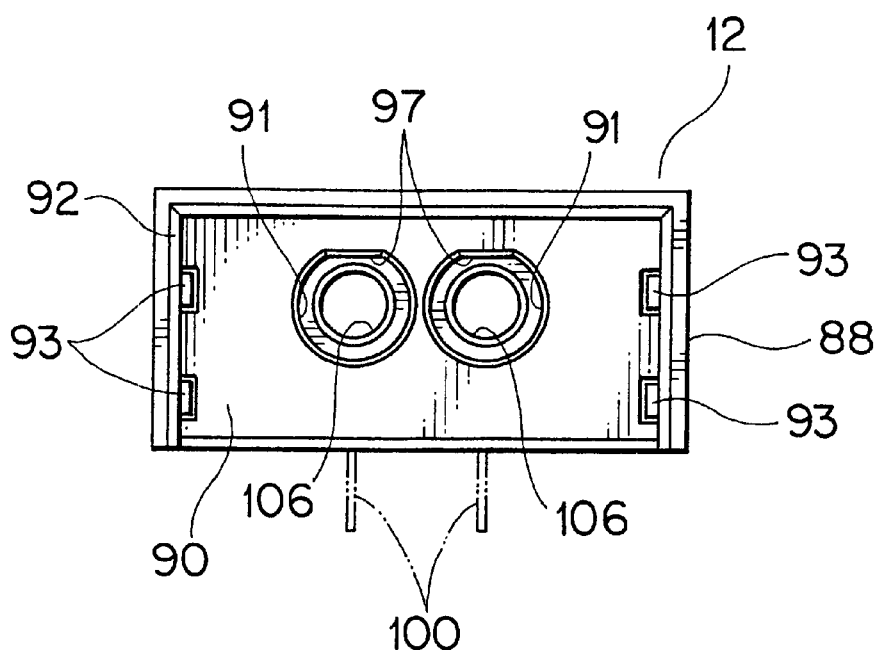
FIG. 19 is a rear view of the optical housing.

To elaborate on the shield casing 10 with reference to FIG. 15, which shows the shield casing in an unfolded condition with dotted lines indicative of where to fold, the rear wall 76 is formed with the convex portions 72, 72 and holding flaps 78, 78 of short length and contiguous to the upper end of the rear wall 76. The rear wall 76 is provided at the right side with the side wall 77 which has the vertically arranged throughholes 73, 73. Extending at the upper end of the side wall 77 is a lid 79 for the left side receiving section 69 (FIG. 9). The side wall 77 is formed at the lower end with the left side fixing portion 74.

Provided at the right side of the side wall 77 is the front wall 75 which has the cutouts 71, 71. The cutouts 71, 71 extend from the lower end of the front wall 75. The front wall 75 is provided at the right side with the side wall 77 which has the vertically arranged throughholes 73, 73. Extending at the upper end of the side wall 77 are a lid 80 for the right side receiving section 69 (FIG. 9) and the partition wall 70. The side wall 77 is formed at the lower end with the right side fixing portion 74 and at the right side with holding flaps 81, 81 of the same size as the holding flaps 78, 78 of the rear wall 76.

Each sleeve 11, as shown in FIG. 1, includes an optical fiber 84 (preferably having the same refractive index as that of the later-described optical fiber 121) which is made up of a core and a cladding (which extend along a center axis), and a cylindrical holder 85 around the optical fiber.

The sleeves 11, 11 may be provided by cutting the later-described optical fiber cables 115, 115 (FIG. 2) in predetermined lengths and grinding them at their both ends.

The optical housing 12 is made of conductive synthetic resin material containing carbon fibers or the like and, as shown in FIGS. 16 to 21, includes an FOT receiving section 88 and sleeve receiving sections 89, 89 integrally projecting from the FOT receiving section 88.

Figure 20:
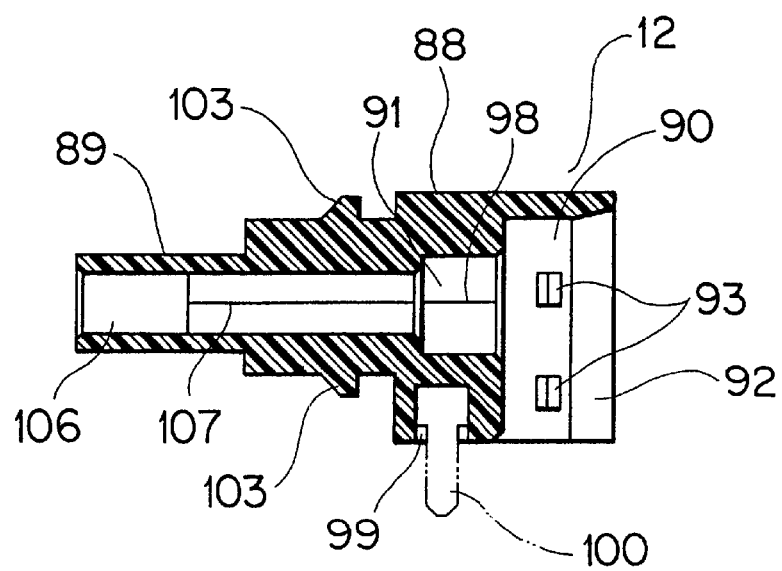
FIG. 20 is a sectional view taken along the line D—D of FIG. 16.
Figure 21:
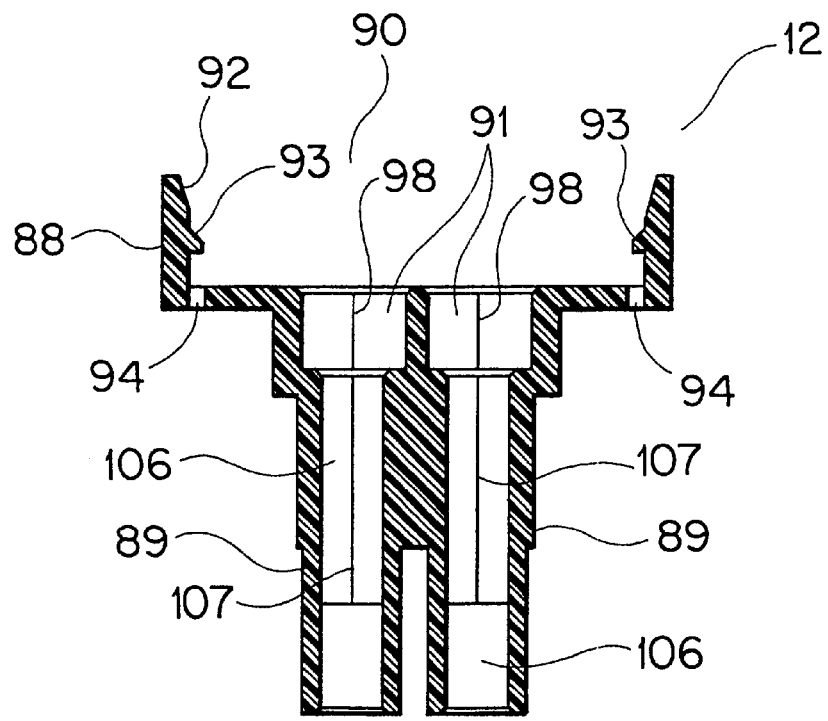
FIG. 21 is a sectional view taken along the line E—E of FIG. 16.
Figure 22:
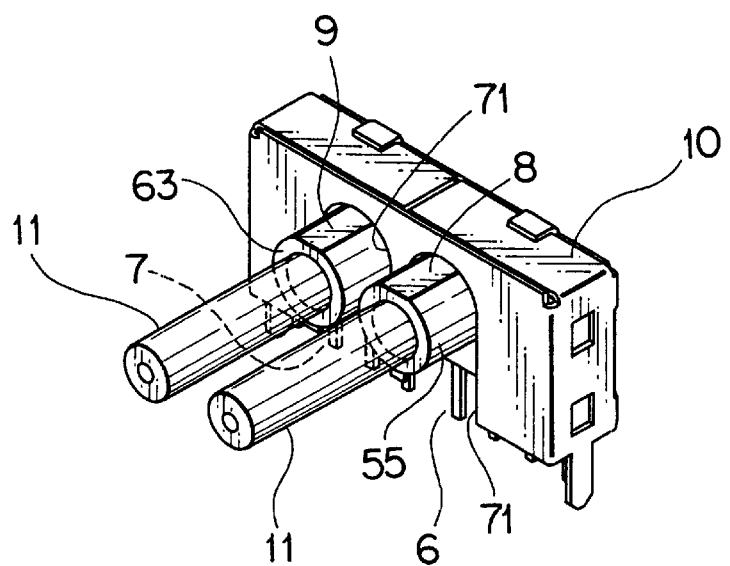
FIG. 22 is a perspective view of the two FOTs set in position.
Figure 23:
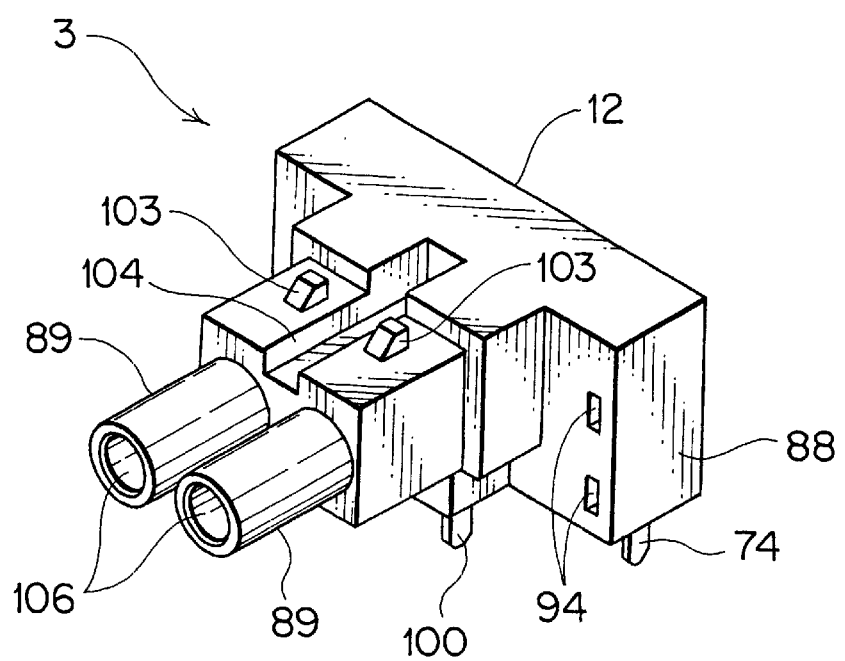
FIG. 23 is a perspective view of the optical connector as in FIG. 1.
Figure 24:
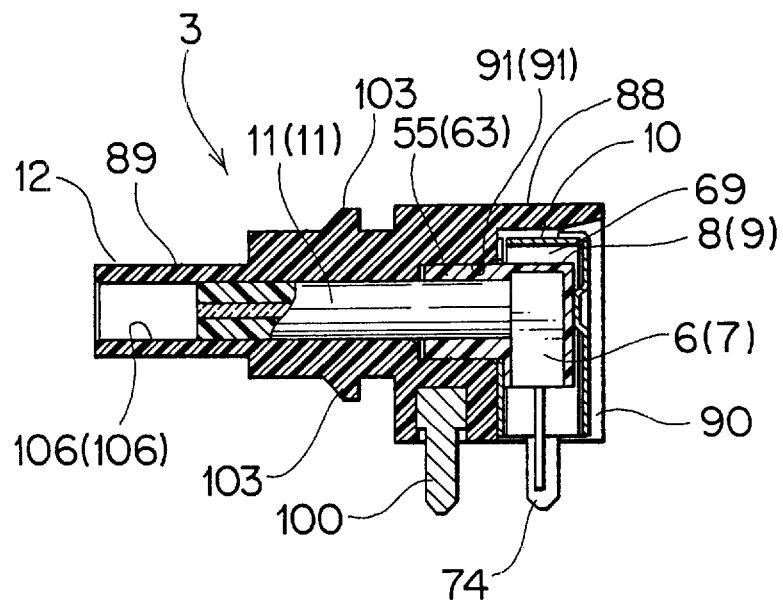
FIG. 24 is a vertical sectional view of the optical connector of FIG. 23.
Figure 25:
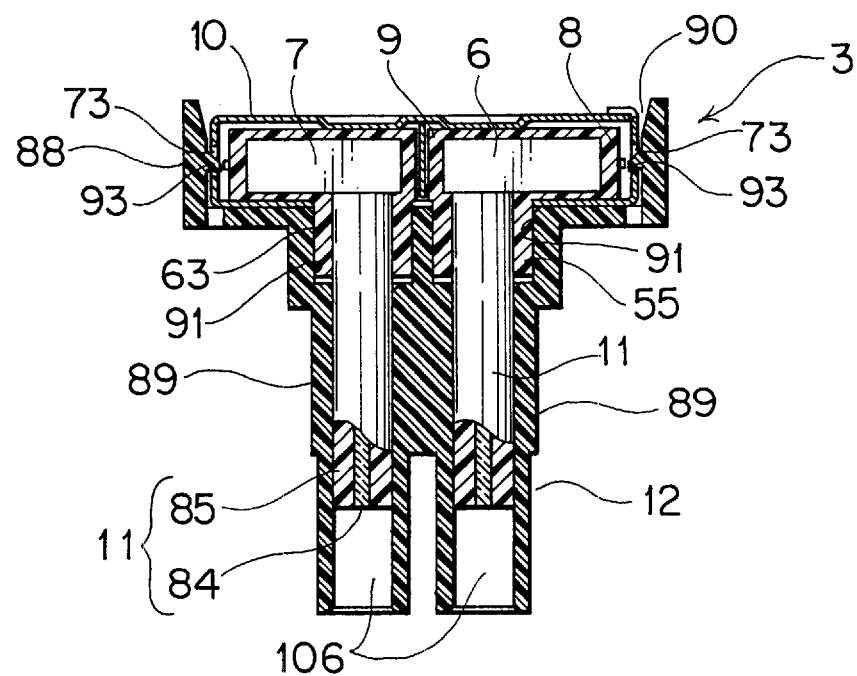
FIG. 25 is a horizontal sectional view of the optical connector of FIG. 23.

The FOT receiving section 88, as best seen in FIGS. 20 and 21, has a body receiving portion 90 for receiving the case bodies 54, 62 of the FOT casings 8, 9 and receiving portions 91, 91, each contiguous to the body receiving portion 90 in a convex manner, for receiving the cylindrical portions 55, 63 of the FOT casings 8, 9.

The body receiving portion 90 of the FOT receiving section 88 opens downwardly (at a side opposed to the printed circuit board 18) and rearwardly, is provided at the rear open end with taper surfaces 92, and is formed to receive the shield casing 10 (FIG. 1) so that its rear wall 76 (FIG. 13) does not protrude from the rear open end. The FOT receiving section 88 has claw-like locking projections 93, 93 formed on its left side and right side walls defining the body receiving portion 90, which lockingly engage in the throughholes 73, 73 (FIG. 1) of the shield casing 10. Each locking projection 93 is provided at a side thereof toward the rear open end with a taper. Denoted 94, 94 are mold-removing holes for forming the locking projections 93, 93.

The receiving portions 91, 91 are bores contiguous to the body receiving portion 90, which correspond in shape to the outer dimensions of the cylindrical portions 55 and 63 (FIG. 1). Each receiving portion 91 is formed with a flat surface 97 corresponding to the flat surface 58, 66 (FIG. 1) of the respective cylindrical portion 55, 63 and with a plurality of minute pressing projections 98 for holding the respective cylindrical portion 55, 63 (FIG. 1). A taper is formed between each receiving portion 91 and the body receiving portion 90.

The lower wall of the FOT receiving section 88 is formed at positions below the receiving portions 91, 91 with recesses 99, 99 for fitting therein of ground terminals 100, 100. The ground terminals 100, 100 are stamped from a conductive thin metal plate to have a shape equal to the fixing portions 74 (FIG. 1) and are fixed to the printed circuit board 18 (FIG. 1).

The sleeve receiving sections 89, 89 each consists of a portion of rectangular outside shape contiguous to the FOT receiving section 88 and a portion of cylindrical outside shape extending from the rectangular portion.

The rectangular portion of each sleeve receiving section 89 has a claw-like locking projection 103 on its upper and lower walls, the locking projection having a taper at a side toward the cylindrical portion. There is formed a groove 104 between the locking projections 103, 103 and thus between the rectangular portions. One of the rectangular portions is provided at a lower corner thereof with a taper surface 105 (FIG. 27) which cooperates with the taper surface 45 (FIG. 4) of the electrical housing 5 to prevent an erroneous assembly as mentioned above.

Each sleeve receiving section 89 is internally formed with a bore of circular cross section in communication with the related receiving portion 91, into which the sleeve 11 (FIG. 1) is pressingly inserted from the receiving portion 91 side. There is formed a taper at the junction between the bore 106 and the related receiving portion 91. The bore 106 is formed with a plurality of minute pressing projections 107 for holding the sleeve 11 (FIG. 1).

With the construction as described above, the electrical connector 2 and the optical connector 3, which are in advance assembled in separate processes, are assembled together to provide the hybrid connector 1. The assembly of the optical connector 3 will now be described with reference to FIG. 1 and FIGS. 22 to 25, the assembly of the electrical connector 2 being already described hereinabove.

First, the FOT 6 is received in the case body 54 of the FOT casing 8, and the FOT 7 in the case body 62 of the FOT casing 9 such that their not-shown light emitting element and light receiving element are located behind the cylindrical portions 55, 63.

The sleeve 11 is then pressed at one end into each cylindrical portion 55, 63 (which may be effected after the shield casing 10 is fitted over the FOT casings 8, 9, though). Thereafter, the FOT casing 8 and the FOT casing 9 are juxtaposed and fitted into the receiving sections 69, 69 of the shield casing 10 so that the cylindrical portions 55, 63 project out through the respective cutouts 71, 71 of the shield casing 10, by which the FOT casings 8 and 9 are set in position, thereby in turn to locate the FOTs 6 and 7 in position. The assembling up to this stage can be in advance effected in a separate process.

The thus obtained assembly is then fitted in the optical housing 12, at which time the locking projections 93, 93 of the body receiving portion 90 engage in the corresponding throughholes 73, 73 of the shield casing 10 (FIG. 25) to lock together the obtained assembly and the optical housing 12. By the above, the sleeves 11, 11 are received in the respective bores 106, 106, with the cylindrical portions 55, 63 received in the receiving portions 91, 91. In this instance, the flat surfaces 58, 66 on the cylindrical portions 55, 63 cooperate with the respective flat surfaces 97, 97 (FIG. 20) of the receiving portions 91, 91 to set the FOTs 6 and 7 in position. The optical connector 3 is thus assembled.

In short, after setting the FOTs 6 and 7 in position by placing them indirectly into the shield casing 10 with the two receiving sections 69, 69, the shield casing 10 is mounted in the optical housing 12 to assemble the optical connector 3. Further, by guiding the cylindrical portions 55, 63 into the respective cutouts 71, 71, the positioning of the FOTs 6 and 7 is effected.

To elaborate on the setting of the FOTs 6 and 7 in position, when placing the FOTs 6 and 7 indirectly into the respective receiving sections 69, 69 of the shield casing 10, the cylindrical portions 55, 63 are guided in the cutouts 71, 71 so that the molded portions 49 and 51 of the FOTs 6 and 7 are spontaneously brought to and set in position relative to each other.

Thereafter, if the shield casing 10 is assembled to the optical housing 12, the flat surfaces 58 and 66 of the cylindrical portions 55 and 63 come into contact with the flat surfaces 97, 97 (FIG. 19) of the optical housing 12 so as to restrict tilting of the molded portions 49 and 51 in a rotational direction about the optical axes which coincide with the center axes of the sleeves 11, 11. The leads 48 of the FOT 6 and the leads 50 of the FOT 7 are thus properly positioned.

In other words, with the aid of the cylindrical portions 55, 63, the positioning of the molded portions 49 and 51 of the FOTs 6 and 7 relative to each other and the positioning of the leads 48 and 50 of the FOTs 6 and 7 are effected. The FOTs 6 and 7 are spontaneously set in position, as mentioned above, during the assembly.

Figure 26:
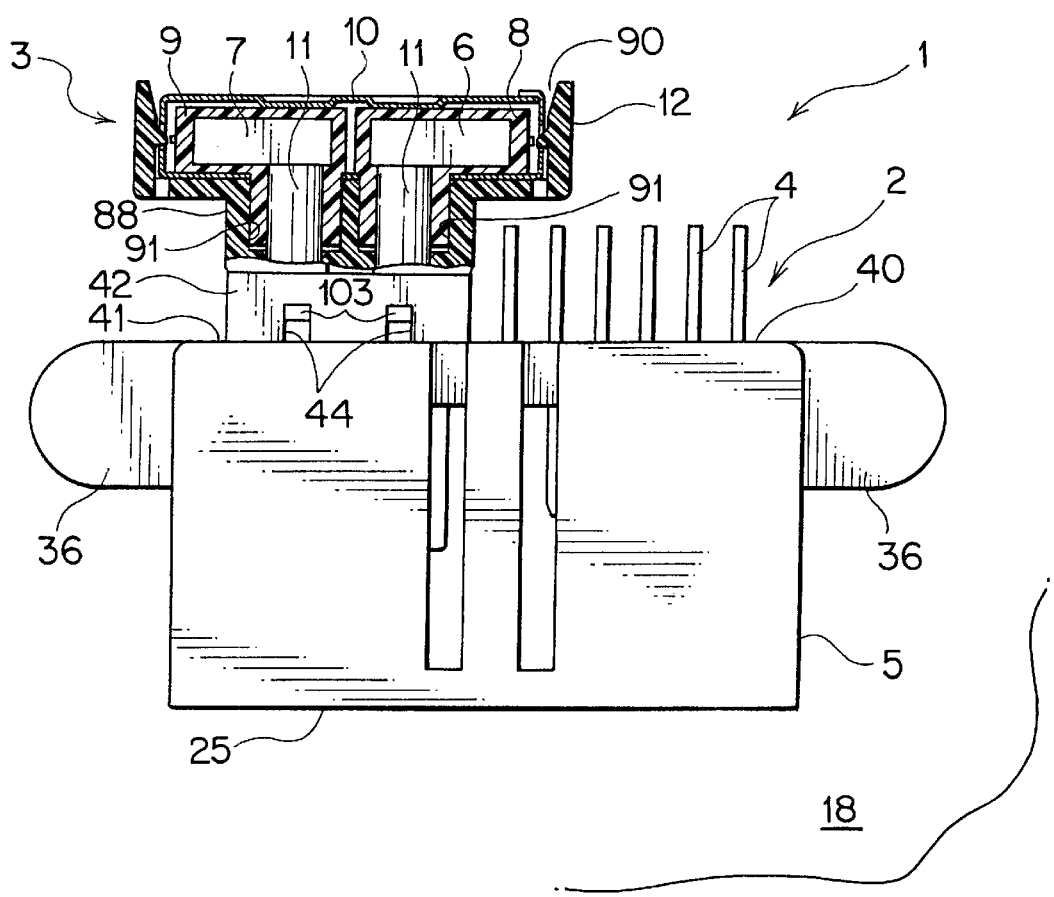
FIG. 26 is a partially sectional plan view of the hybrid connector.
Figure 27:
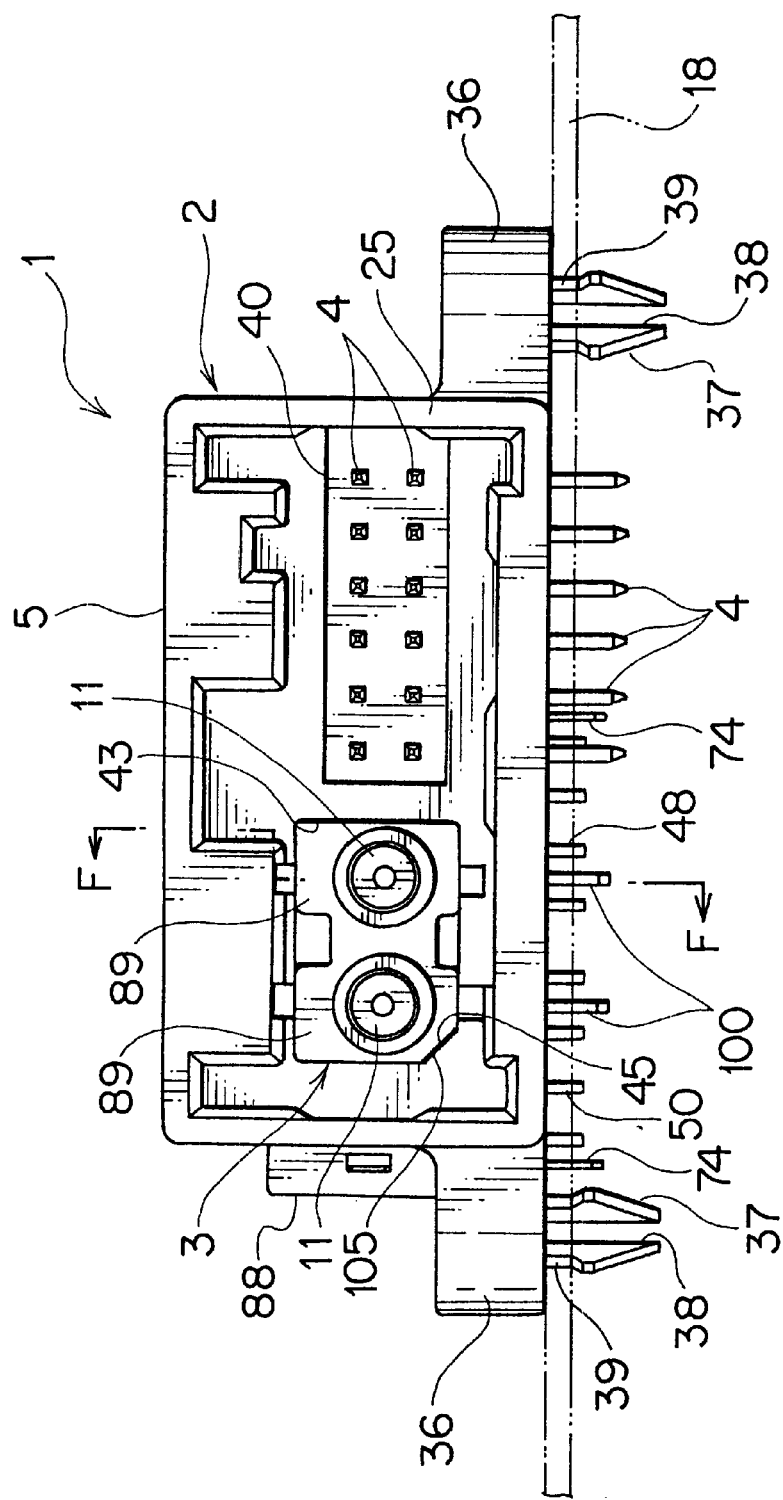
FIG. 27 is a front view of the hybrid connector.
Figure 28:
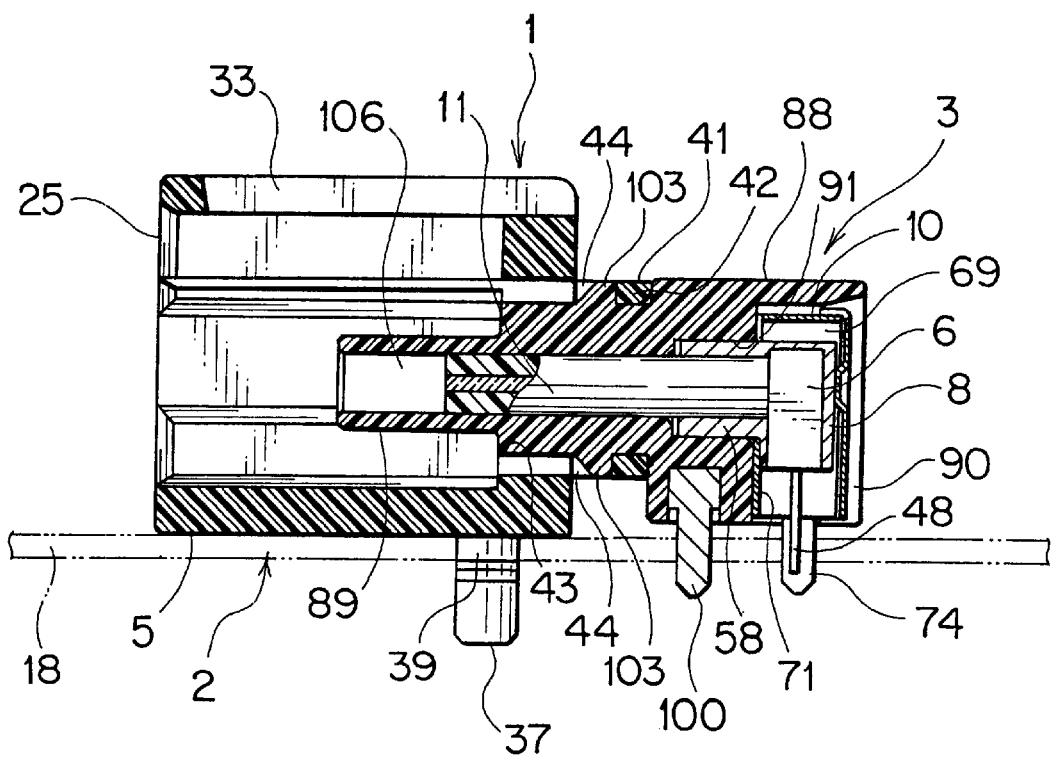
FIG. 28 is a sectional view taken along the line F—F of FIG. 27.

Thereafter, as shown in FIGS. 26 to 28, the optical connector 3 is mounted in the optical connector mount section 41 of the electrical connector 2 to assemble the hybrid connector 1.

In other words, the sleeve receiving sections 89, 89 of the optical connector 3 are inserted into the insertion opening 43 at the optical connector mount section 41 until the four locking projections 103 lockingly engage in the corresponding four engagement holes 44 (FIGS. 3 and 28) of the electrical housing 5. A series of assembling operations are thus completed. The hybrid connector 1 is then implemented on the printed circuit board 18. The clips 37, 37 of the electrical housing 5 engage in the corresponding holes (not shown) on the board 18. The ground terminals 100, 100 of the optical connector 3, the fixing portions 74, 74 and the leads 48, 50 of the FOTs 6, 7 are fixed by soldering to the printed circuit board 18.

With the construction as mentioned above, by indirectly inserting the FOTs 6 and 7 into the receiving sections 69, 69 of the shield casing 10, the cylindrical portions 55, 63 are guided in the cutouts 71, 71 so as to set the FOTs 6 and 7 in position. If the FOTs 6 and 7 are set in position in the shield casing 10, the optical connector 3 can be easily assembled by mounting the shield casing 10 in the optical housing 12. In other words, owing to the FOT casings 8, 9 formed with the cylindrical portion 55, 63 for receiving the sleeve 11, 11 and the shield casing 10 formed with the cutouts 71, 71 for guiding and positioning the cylindrical portions 55, 63, the FOTs 6 and 7 can, in advance in a separate process, be placed indirectly into the receiving sections 69, 69 of the shield casing 10. This allows the optical connector 3 to be easily assembled only by mounting the shield casing 10 in the optical housing 12.

With the construction as mentioned above, because the optical connector 3 can be assembled without care to the locations of the FOTs 6 and 7, an improvement is made in the productivity of the optical connectors 3, which in turn leads to an improvement in the hybrid connectors 1 themselves. Further, the leads 48 and 50 are prevented from becoming crimped.

The FOT 6 and the FOT 7, if their molded portions 49, 51 are formed to have the functions of the FOT casing 8 and the FOT casing 9, can be directly received and retained in the related receiving sections 69, 69 of the shield casing 10.

This invention is applicable not only to an optical connector such as the optical connector 3 for use in a hybrid connector, but also to an optical connector for use as a typical receptacle.

The thus assembled hybrid connector 1 of a male type is coupled to the mating hybrid connector 13 of a female type as shown in FIG. 2, which, as mentioned hereinabove, includes the electrical connector 14 and the optical connector 15 mounted in the electrical connector. The electrical connector 14 and the optical connector 15 mate with the electrical connector 2 and the optical connector 3, respectively, when the hybrid connectors 1 and 13 are coupled together. In FIG. 2, denoted 142 is an electrical housing, 141 are electrical terminals, and 143 are spacers for locking the electrical terminals 141 in place in the electrical connector 14. Denoted 116 is an optical adapter which receives therein the ferrules 114 which in turn receive respective optical fiber cables 115 with the POF 121, which optical adapter 116 is mounted in the electrical housing 142 to constitute the optical connector 15. The holder 16 is fitted from below into the electrical housing 142 and through the optical adapter 116 to lock the optical adapter 116 and the ferrules 114 in place.

Having now fully described the invention, it will be apparent to one of ordinary skill in the art that many changes and modifications can be made thereto without departing from the spirit and scope of the invention as set forth herein.

What is claimed is:

1. A method of assembling an optical connector including a light emitting module and a light receiving module, said light emitting module having a first molded portion of transparent synthetic resin, a light emitting element embedded in said first molded portion and first leads extending out of said first molded portion, said light receiving module having a second molded portion of transparent synthetic resin, a light receiving element embedded in said second molded portion and second leads extending out of said second molded portion, comprising the steps of:

placing said light emitting module and said light receiving module directly or indirectly into respective module receiving sections formed in a casing so as to set said light emitting module and said light receiving module in position; and then mounting said casing in an optical housing;

wherein said first and second molded portions are directly or indirectly provided, at positions corresponding to said light emitting and light receiving elements, with respective cylindrical portions for receiving a sleeve with a core and a cladding, and wherein said step of placing said light emitting module and said light receiving module into said respective module receiving sections comprises guiding said cylindrical portions in respective cutouts formed at said module receiving sections so as to set said light emitting module and said light receiving module in position.

2. The method according to claim 1, wherein said cutouts have a width equal to an outer diameter of said cylindrical portions.

3. An optical connector comprising:

a light emitting module having a first molded portion of transparent synthetic resin, a light emitting element embedded in said first molded portion and first leads extending out of said first molded portion;

a light receiving module having a second molded portion of transparent synthetic resin, a light receiving element embedded in said second molded portion and second leads extending out of said second molded portion;

two sleeves of cylindrical shape, each having a core and a cladding extending along a center axis thereof;

a casing having two module receiving sections for receiving said respective first and second-molded portions directly or through respective first and second module casings fitted over said first and second molded portions; and a housing having a receiving section for receiving said sleeves and said casing, wherein said first and second molded portions or said first and second module casings are provided, at positions corresponding to said light emitting and light receiving elements, with respective cylindrical portions for receiving said sleeves, and said casing has cutouts formed in a wall thereof defining said module receiving sections for guiding said cylindrical portions so as to set said light emitting module and said light receiving module in position.

4. The optical connector according to claim 3, wherein said cutouts have a width equal to an outer diameter of said cylindrical portions.

5. The optical connector according to claim 3, wherein said casing is formed of electrically conductive material.

6. A hybrid connector comprising an optical connector as recited in claim 3, and an electrical connector having an electrical housing with a mount section for mounting said optical connector and terminals inserted into said electrical housing.

7. A light emitting and light receiving modules positioning method for an optical connector including a light emitting module and a light receiving module, said light emitting module having a first molded portion of transparent synthetic resin, a light emitting element embedded in said first molded portion and first leads extending out of said first molded portion, said light receiving module having a second molded portion of transparent synthetic resin, a light receiving element embedded in said second molded portion and second leads extending out of said second molded portion, comprising the steps of:

placing said light emitting module and said light receiving module directly or indirectly into respective module receiving sections formed in a casing so as to set said first and second molded portions in position relative to each other; and then mounting said casing in an optical housing while restricting tilting of said first and second molded portions in a rotational direction about an optical axis of said optical connector so as to set said first and second leads in position, wherein said first and second molded portions are directly or indirectly provided, at positions corresponding to said light emitting and light receiving elements, with respective cylindrical portions for receiving a sleeve with a core and a cladding, and wherein said stop of placing said light emitting module and said light receiving module into said respective module receiving sections and said step of restricting tilting of said first and second molded portions are effected trough said cylindrical portions, and further wherein said step of placing said light emitting module and said light receiving module into said respective module receiving sections comprises guiding said cylindrical portions in respective cutouts formed at said module receiving sections so as to set said first and second molded portions in position relative to each other.

8. The method according to claim 7, wherein said cutouts have a width equal to an outer diameter of said cylindrical portions.

9. The method according to claim 7, wherein said step of restricting tilting of said first and second molded portions so as to set said first and second leads in position comprises bringing into contact with each other flat surfaces formed on said cylindrical portions and in said optical housing.

10. The method according to claim 7, wherein said cylindrical portions are of such an inner diameter as to snugly receive said sleeves.

11. An optical connector comprising:

a light emitting module having a first molded portion of transparent synthetic resin, a light emitting element embedded in said first molded portion and first leads extending out of said first molded portion;

a light receiving module having a second molded portion of transparent synthetic resin, a light receiving element embedded in said second molded portion and second leads extending out of said second molded portion;

two sleeves of cylindrical shape, each having a core and a cladding extending along a center axis thereof;

a casing having two module receiving sections for receiving said respective first and second molded portions directly or through respective first and second module casings fitted over said first and second molded portions; and a housing having a receiving section for receiving said sleeves and said casing, wherein said first and second molded portions or said first and second module casings are provided, at positions corresponding to said light emitting and light receiving elements, with respective cylindrical portions for receiving said sleeves, said cylindrical portions have a flat surface formed thereon, said casing has cutouts formed in a wall thereof defining said module receiving sections for guiding said cylindrical portions so as to set said light emitting module and said light receiving module in position, and said housing has a flat surface formed in said module receiving sections, which corresponds to said flat surface on said cylindrical portions.

12. The optical connector according to claim 11, wherein said cutouts have a width equal to an outer diameter of said cylindrical portions.

13. The optical connector according to claim 11, wherein said casing is formed of electrically conductive material.

14. The optical connector according to claim 11, wherein said cylindrical portions are of such an inner diameter as to snugly receive said sleeves.

15. A hybrid connector comprising an optical connector as recited in claim 11, and an electrical connector having an electrical housing with a mount section for mounting said optical connector and terminals inserted into said electrical housing.

* * * * *